(No Model.)
R. W. LUNDY.
TRACK FOR DOOR HANGERS.
No. 500,146. Patented June 27, 1893.
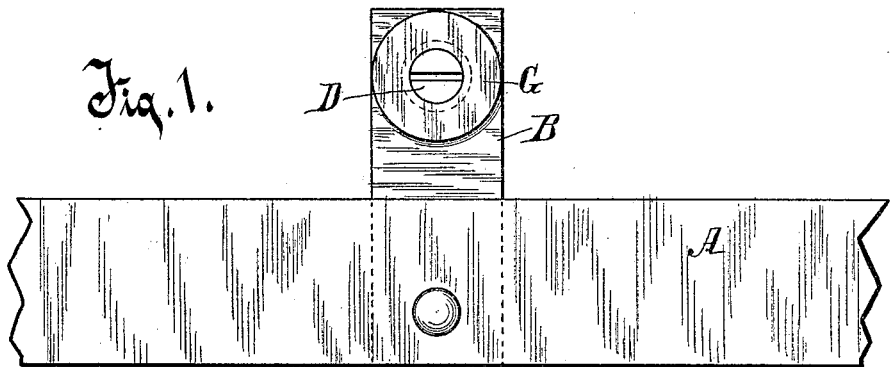
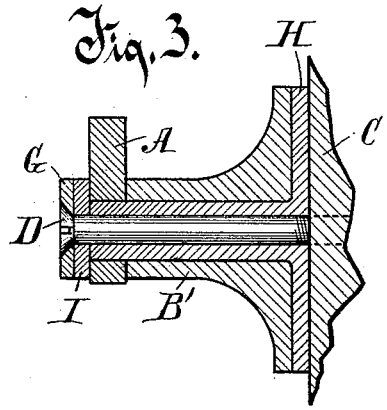
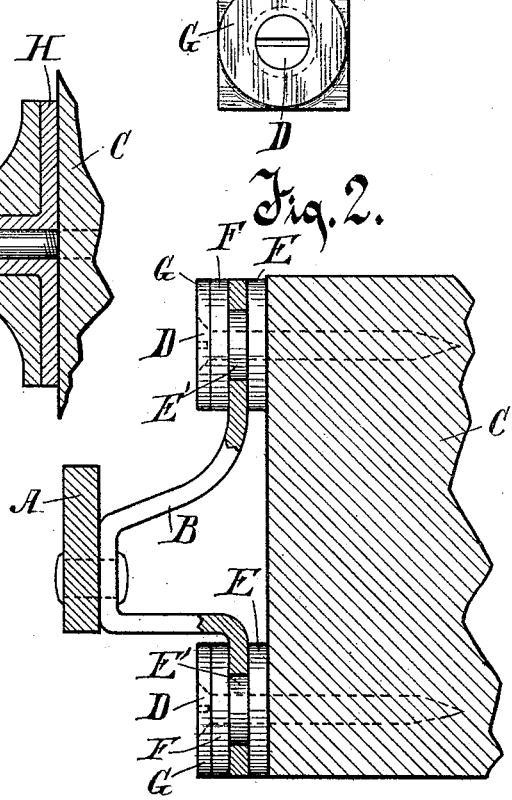
Witnesses.
O. W. Keeney,
Anna V. Faust.
Inventor.
Richard W. Lundy
By
Benedict & Morsell
Attorneys.
THE NORRIS PETERS CO., PHOTO-LITHO., WASHINGTON, D. C.

UNITED STATES PATENT OFFICE.

RICHARD W. LUNDY, OF SOUTH BEND, INDIANA.

TRACK FOR DOOR-HANGERS.

SPECIFICATION forming part of Letters Patent No. 500,146, dated June 27, 1893.

Application filed April 13, 1892. Serial No. 429,030. (No model.)

*To all whom it may concern:*

Be it known that I, RICHARD W. LUNDY, of South Bend, in the county of St. Joseph and State of Indiana, have invented a new and useful Improvement in Tracks for Door-Hangers, of which the following is a description, reference being had to the accompanying drawings, which are a part of this specification.

My invention relates to improvements in door hanger tracks that are adapted for use with sliding doors in residences.

The object of my invention is to provide means for obviating the noise that is ordinarily produced by the travel of the wheels of the door hanger on the track, particularly where the track and wheels are of steel or other suitable metal.

In the drawings, Figure 1, is a front elevation of one of my improved brackets used with my door hanger track, a fragment of which track is shown in the foreground therewith and as secured thereto. Fig. 2, is a view of the same bracket shown in Fig. 1 at a right angle thereto, parts being in section. Fig. 3, is a central sectional view of a modified form of the device.

A is the track, constructed preferably of a flat steel bar arranged horizontally and secured permanently to a series of brackets of the style and form shown at B. The bracket B is secured to the door frame C conveniently by screws D D passing through apertures therefor in the two feet of the bracket.

For obviating the noise that would ordinarily occur by reason of the travel of the hanger wheels on the track I interpose cushions or packing preferably of rubber, in and about the bearings of the feet of the bracket against the door frame. These rubber packings in the form shown in Fig. 2 consist of tubular flanged rubbers E E, the annular radial flanges of which are interposed between the frame and the feet of the bracket, the tubular or body parts E' of which enter the apertures therefor in the feet of the bracket about the screws D D. Other annular rubber packings F are interposed about the screws D D between the outer surfaces of the feet of the bracket and annular metal washers G G, through which metal washers the screws pass and with which the heads of the screws engage and hold them and the other parts firmly to the door frame. By this construction the brackets are sound-insulated from the door frame.

In the form shown in Fig. 3, the brackets B' consist of a post having a central aperture, against which post the rail A is placed and the rail or track and post-bracket are secured directly to the door frame by a screw D. In this form of device the sound insulation is obtained by means of the tubular flanged packing H interposed between the frame and the foot of the bracket and around the screw D between it and the bracket and the track A, and the annular packing I interposed between the track A and the washer G.

What I claim as my invention, and desire to secure by Letters Patent, is—

1. The combination with a fixed support, of brackets, secured rigidly thereto, a door-hanger track secured to the brackets, screws or bolts passing through apertures therefor in the brackets and entering the fixed support, and sound-obviating packing between the brackets and the fixed support and between the screws or bolts and the brackets, substantially as described.

2. The combination with a fixed support, of brackets B secured rigidly thereto, a door-hanger track A riveted to the brackets, screws D passing through apertures therefor in the brackets and turning into the fixed support, and sound-obviating tubular packing provided with flanges E interposed between the fixed support and the brackets and around the screws in the apertures in the brackets, and other annular sound-obviating packing F interposed between the brackets and screw receiving washers G, substantially as described.

In testimony whereof I affix my signature in presence of two witnesses.

RICHARD W. LUNDY.

Witnesses:
ARTHUR L. MORSELL,
C. T. BENEDICT.